Patented Feb. 19, 1929.

1,702,711

UNITED STATES PATENT OFFICE.

RALF BARTH TRUSLER, OF PITTSBURGH, PENNSYLVANIA, ASSIGNOR TO THE ROESS-LER & HASSLACHER CHEMICAL COMPANY, OF NEW YORK, N. Y., A CORPORATION OF NEW YORK.

PRODUCTION OF BENZONITRILE AND OTHER ARYL CYANIDES.

No Drawing. Application filed June 20, 1927. Serial No. 200,303.

The usual methods for preparing phenyl cyanide and other aromatic or aryl cyanides are three in number; fusion of an aromatic alkali sulfonate with an alkali cyanide, reaction of diazo aromatic compounds with metal cyanides, and reaction of aryl halide compounds with certain metal cyanides.

In the latter method brominated aryl compounds are preferred, because they react more readily than the corresponding chlorinated compounds. Varying amounts of nitriles are formed even when heating under pressure and with certain metal cyanides such as cuprous cyanide and zinc cyanide. But in most cases, and particularly when attempting to substitute a nitrile group in place of a chloride radical, the yields are poor and the reaction unsatisfactory.

I have found that the reaction between metal cyanides and halogenated aromatic compounds, such as chlorbenzene, is greatly improved by the presence in the reaction of certain catalysts. These catalysts consist of the bromides of copper, nickel, and cobalt, separately or mixed, or of finely divided copper, nickel, and cobalt, separately or mixed, with or without the presence of a compound capable of furnishing bromide ions. Furthermore, I have discovered that when bromide salts of copper, nickel, and cobalt are introduced into the reaction mixture to serve as catalyst, they are generally reduced, often to the metal itself. The finely divided metals thus produced have a catalytic effect, although they possess less value as catalysts due to the absence of the bromide ion.

The reaction whereby an aryl cyanide is formed from a halogenated aryl compound, a metal cyanide and a catalyst is illustrated by the following equation:

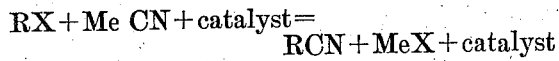

RX + Me CN + catalyst = RCN + MeX + catalyst wherein R represents an aryl group, X a halide radical, and Me a metal radical.

I have found that certain metallic cyanides are most suitable for this process; these are the cyanide salts of the metals of the second division of the first and second groups of the elements tabulated in the periodic table, of which the cyanides of copper, silver and zinc are specific examples.

I have found that the substitution of a nitrile group for a halide radical proceeds best in cases where only one halide radical of the same kind is attached to the same aryl radical, and I have also found that the aryl compound may contain other substituent groups with the exception of groups that cause decomposition or are reactive under the conditions of the reaction. I have found amino, carboxyl and hydroxyl groups to be objectionable. For example, 1 methyl 2 chlorobenzene reacts well with zinc cyanide in the presence of a catalyst to produce ortho-tolunitrile, while 1 hydroxy 2 chlorobenzene under similar conditions produces a tarry product in which only small amounts of nitrile can be found. I have therefore limited the applicaiton to the reaction involving unsubstituted aryl halides and those aryl halides which do not contain groups which are active under the conditions of working and have defined these in the claims as "aryl halides whose substituent groups are inactive in the presence of the reaction materials at the temperature of the desired reaction."

The following examples illustrate the use of this catalytic method for the production of aryl cyanides:

Example I.

Silver cyanide and bromobenzene react very slowly when heated together under pressure, but when about five per cent by weight of nickel and copper bromides was added to the silver cyanide, which was then heated at 300° for about 20 hours, there was a marked increase in the reactivity of the compounds, and an appreciable yield of phenyl cyanide was obtained.

Example II.

In order to demonstrate the valuabe catalytic action of the materials described above, four portions of zinc cyanide weighing about 12.45 grams were similarly dried, and to each tube was added about 25 grams of dry chlorobenzene, and then to one tube was added 0.5 gram anhydrous copper bromide, to the second tube 0.5 gram anyhdrous nickel bromide, to the third tube anhydrous cobalt bromide, while no catalyst was added to the fourth tube. The tubes were sealed and heated for about ten to fifteen hours at 300°. It will be found that at the end of this time the ingredients of the tubes have been altered and that a reaction has taken place. In the first three tubes the original heterogonous mixture has been converted into a rather uniform, dark-colored liquid which partly or completely solidifies upon cooling. The contents of the tubes were individually transferred to flasks, steam distilled, and the oily portions collected and separately fractionated. Yields, from 17.5 grams to 19.6 grams of phenyl cyanide, boiling at 191 to 192° and amounting to 85 to 95% of theory were obtained from the tubes in which a catalyst was used. Much less than fifty per cent yield of phenyl cyanide was obtained from the fourth tube in which no catalyst was used.

Example III.

A reaction mixture of ten grams of zinc cyanide (92.3% purity) which has been dried at about 200–250° for about one hour, 25 grams of ortho chlorotoluene and 0.5 gram of cupric bromide were sealed in a glass tube and heated at about 300° for ten to twelve hours. During this time (or longer if necessary), the original, nearly white mixture was converted into a dark or brown-colored product which hardened upon cooling. The content of the tube was then transferred to a flask and was steam distilled. The oily part of the distillate was separated from the water, dried and then distilled, under reduced pressure. After the excess of o-chlorotoluene was removed, a colorless fraction was obtained which distills at 108° at about 7.5 m.m. or at 110° at 9.5 m.m. and at 204–205° at atmospheric pressure. This fraction which is o-tolunitrile weighed in the neighborhood of 16 grams, and represented about 80% of the theoretical yield.

Example IV.

Ten grams of zinc cyanide which had previously been dried at from 150° to 300° was put into a glass tube to which was then added about 0.5 of anhydrous nickel bromide (or anhydrous cupric bromide), and about 38 grams of alpha bromonaphthalene. The tube was then sealed and heated at about 300° for ten hours (or longer if necessary), which caused a reaction to take place thus converting the ingredients into a somewhat viscous, colored liquid which solidified upon cooling. The content of the tube was transferred to a flask where it was steam distilled to remove the excess and unused bromonaphthalene. The residue in the flask was then extracted with benzene. The solution was then distilled at atmospheric pressure to remove the benzene and finally vacuum distilled to recover the product. The naphthyl cyanide (alpha naphthanitrile) obtained in this way boiled at 182–184° at a pressure of 8 m. m., and after solidifying it has a melting point of 28–29°, and of 36.5° after redistillation and crystallization. The compound obtained was easily identified by hydrolyzing it into naphthoic acid by sulfuric acid dihydrate, $$H_2SO_4.2H_2O.$$

The amount of alpha naphthyl cyanide thus recovered was about 22 to 24 grams and amounted to about 95% of theory.

Example V.

A mixture of the metallic bromide catalysts may be used advantageously. A reaction mixture was made up of the following:
405 g. of 88% Zn (CN)$_2$, previously dried,
750 g. of anhydrous chlorobenzene,
20 g. of anhydrous cupric bromide,
4 g. of anhydrous nickel bromide
These ingredients were put into a small autoclave having a capacity of about 1.5 liters and were well mixed. The autoclave was sealed and then gradually heated up to 295–300° thru about three hours and the temperature was then maintained at approximately 300° for about three hours with stirring. The reaction was exothermic and progressed with reduced exterior heating while the synthesis took place. The contents of the autoclave were transferred to a steam still where all volatile, oily constituents were distilled out. The oily portion of the distillate was dried and fractionated and from it was obtained 594 grams of phenyl cyanide, a yield of 95.0% of theory.

Claims:

1. A process for the production of an aryl cyanide consisting of reacting an aryl halide whose substituent groups are inactive in the presence of the reaction materials at the temperature of the desired reaction, with a metal cyanide in the presence of a catalyst of the general formula MBr, wherein M is a metal of the group comprising Cu, Ni, and Co.

2. A process for the production of an aryl cyanide consisting of reacting an unsubstituted aryl halide and a cyanide of a metal of the second division of the first and second groups of the periodic table in the presence of a catalyst of the general formula MBr, wherein M is a metal of the group comprising Cu, Ni, and Co.

3. A process for the production of an aryl cyanide consisting of reacting an aryl halide whose substituent groups are inactive in the presence of the reaction materials at the temperature of the desired reaction, with a cyanide of a metal of the second division of the first and second groups of the periodic table in the presence of a catalyst of the general formula MBr, wherein M is a metal of the group comprising Cu, Ni, and Co.

4. A process for the production of an aryl cyanide consisting of reacting an aryl halide whose substituent groups are inactive in the presence of the reaction materials at the temperature of the desired reaction, with a cyanide of a metal of the second division of the first and second groups of the periodic table in the presence of copper bromide as a catalyst.

5. A process for the production of an aryl cyanide consisting of reacting an aryl halide whose substituent groups are inactive in the presence of the reaction materials at the temperature of the desired reaction, with a cyanide of a metal of the second division of the first and second groups of the periodic table in the presence of a mixture of catalysts of the general formula MBr, wherein M is a metal of the group comprising Cu, Ni, and Co.

6. A process for the production of an aryl cyanide consisting of reacting an aryl halide whose substituent groups are inactive in the presence of the reaction materials at the temperature of the desired reaction, with zinc cyanide in the presence of a catalyst of the general formula MBr, wherein M is a metal of the group comprising Cu, Ni, and Co.

7. A process for the production of an aryl cyanide consisting of reacting an unsubstituted aryl halide and zinc cyanide in the presence of a catalyst of the general formula MBr, wherein M is a metal of the group comprising Cu, Ni, and Co.

8. A process for the production of an aryl cyanide consisting of reacting an aryl halide whose substituent groups are inactive in the persence of the reaction materials at the temperature of the desired reaction, with zinc cyanide in the presence of copper bromide as a catalyst.

9. A process for the production of an aryl cyanide consisting of reacting an aryl halide whose substituent groups are inactive in the presence of the reaction materials at the temperature of the desired reaction, with zinc cyanide in the presence of a mixture of catalysts of the general formula MBr, wherein M is a metal of the group comprising Cu, Ni, and Co.

10. A process for the production of an aryl cyanide consisting of reacting an aryl chloride whose substituent groups are inactive in the presence of the reaction materials at the temperature of the desired reaction, with a cyanide of a metal of the second division of the first and second groups of the periodic table in the presence of a catalyst of the general formula MBr, wherein M is a metal of the group comprising Cu, Ni, and Co.

11. A process for the production of an aryl cyanide consisting of reacting an aryl chloride whose substituent groups are inactive in the presence of the reaction materials at the temperature of the desired reaction, with zinc cyanide in the presence of a catalyst of the general formula MBr, wherein M is a metal of the group comprising Cu, Ni, and Co.

12. A process for the production of an aryl cyanide consisting of reacting an aryl chloride whose substituent groups are inactive in the presence of the reaction materials at the temperature of the desired reaction, with zinc cyanide in the presence of copper bromide as a catalyst.

13. A process for the production of an aryl cyanide consisting of reacting an aryl chloride whose substituent groups are inactive in the presence of the reaction materials at the temperature of the desired reaction, with zinc cyanide in the presence of a mixture of catalysts of the general formula MBr, wherein M is a metal of the group comprising Cu, Ni, and Co.

14. A process for the production of phenyl cyanide consisting of reacting chlorobenzene and zinc cyanide in the presence of a catalyst of the general formula MBr, wherein M is a metal of the group comprising Cu, Ni, and Co.

15. A process for the production of phenyl cyanide consisting of reacting chlorobenzene and zinc cyanide in the presence of copper bromide.

16. A process for the production of phenyl cyanide consisting of reacting chlorobenzene and zinc cyanide in the persence of a mixture of catalysts of the general formula MBr, wherein M is a metal of the group comprising Cu, Ni, Co.

Signed at Pittsburgh, in the county of Allegheny and State of Pennsylvania this 15th day of June A. D. 1927.

RALF BARTH TRUSLER.